Fig. 2

United States Patent Office 3,561,293
Patented Feb. 9, 1971

1

3,561,293
HYDRAULIC CONTROL SYSTEM FOR AUTOMATIC TRANSMISSION
Shojiro Fujita, Fujisawa, and Toshio Miyazaki, Yokohama, Japan, assignors to Nissan Jidosha Kabushiki Kaisha, Yokohama, Japan
Filed Dec. 11, 1968, Ser. No. 782,990
Claims priority, application Japan, Dec. 22, 1967, 42/81,842
Int. Cl. B60k 21/10
U.S. Cl. 74—869          2 Claims

ABSTRACT OF THE DISCLOSURE

A hydraulic control system for an automatic transmission for vehicles to attain proper engagement and disengagement timing at upshifting, the system providing a timing valve means operating at low throttle pressure and to exhaust the engage side chamber of a servo only at an intermediate portion of displacement of the valve spool.

---

The present invention relates generally to control system for multiple speed ratios power transmission mechanisms, and more particularly to a hydraulic control system for an automatic transmission of a vehicle, providing an input and an output shaft, at least one planetary gear unit disposed between the shafts, and a plurality of friction elements such as friction brakes and friction clutches, to effect a plurality of gear ratios by selectively engaging or disengaging the friction elements by hydraulic pressure produced in the hydraulic system.

To attain smooth shifting between a lower gear ratio and a higher gear ratio by the above mentioned automatic transmission, means must be provided to prevent excess shock caused by too large an engaging torque capacity of the friction elements or excess slipping caused by too small a torque capacity, and further, the timing relation between the disengagement of one friction element and the engagement of another friction element must be carefully determined. The timing relation must be changed corresponding to operating conditions of the vehicle.

The above mentioned automatic transmission further includes a first friction element to attain higher gear ratio by engagement thereof, a first hydraulic servo to actuate the first friction element, a second friction element to attain lower gear ratio by engagement thereof, and a second hydraulic servo to actuate the second friction element. The second hydraulic servo disengages the second friction element by a spring force and the hydraulic pressure applied simultaneously to both sides of the servo piston having an area difference. By the proper selection of the spring force and the area difference, the timing of the disengagement of the second friction element is determined relative to the engagement of the first friction element. The timing generally accommodates a full load condition of the engine. However, the proper timing relation between engagement of the first friction element and the disengagement of the second friction element differs according to operating conditions of the vehicle, and, as mentioned above, the above mentioned mechanism cannot be accommodated to all operating conditions, e.g. when the mechanism provides a proper timing relation at the full load condition, uncomfortable shock will occur at a light load condition.

For example, when an intermediate gear brake engages at 2nd speed ratio and a direct coupling clutch engages at 3rd speed ratio, at an upshift from 2nd to 3rd speed ratio, if both friction elements engage simultaneously the output shaft is braked, and if both friction elements are disengaged, the engine will rotate freely.

2

In this case, as to the engagement and the disengagement timing relation of the friction elements, a proper overlap of engagement of the friction elements will provide smooth upshifting by forcibly slipping the friction elements when the engine input torque is high enough. If the instantaneous neutral condition occurs by the disengagement of both friction elements, the engine rotation will increase and result in run away of the engine.

On the contrary, when the operating condition is one of coasting or low engine driving torque, the overlap of engagement of both friction elements will result in a braking action of the output shaft because of low torque and an uncomfortable shock will occur. By providing a proper time lag or instantaneous neutral condition between the engagement and the disengagement of the friction elements, the smooth upshift without any shock or run away will be performed at the low torque operating condition.

Accordingly, an object of the present invention is to provide a hydraulic control system having a simple valve means to control the timing relation between the engagement and the disengagement of friction elements so as to obtain a smooth shifting throughout different operating conditions of the vehicle.

More particularly, it is an object of the present invention to provide a hydraulic control system having a simple valve means, the valve spool thereof being shifted by hydraulic control to decrease fluid pressure in an engage side fluid chamber of the hydraulic servo of the friction element to be disengaged when upshifting from intermediate to high speed ratio at a low torque operating condition so as to provide proper timing relation between the engagement and disengagement by quick disengagement of the friction element according to the operating condition.

Thus, by providing overlap of engagement of both friction elements to accommodate a high input torque condition by the transmission mechanism, and by providing the valve means according to the invention to attain quick disengagement of the friction element to accommodate a low torque condition, a smooth shifting operation can be attained under all operating conditions.

Further and more specific objects, features and advantages of the present invention and the manner in which the invention is carried into practice are made apparent in the following detailed description of preferred embodiment, by way of example, wherein reference is made to the accompanying drawing, in which;

FIG. 2 shows a diagram of one embodiment of a hydraulic control system, according to the invention, to control the transmission shown in FIG. 1.

In the drawing, the same reference numerals are used for similar parts for the sake of clarity.

Figure 1:
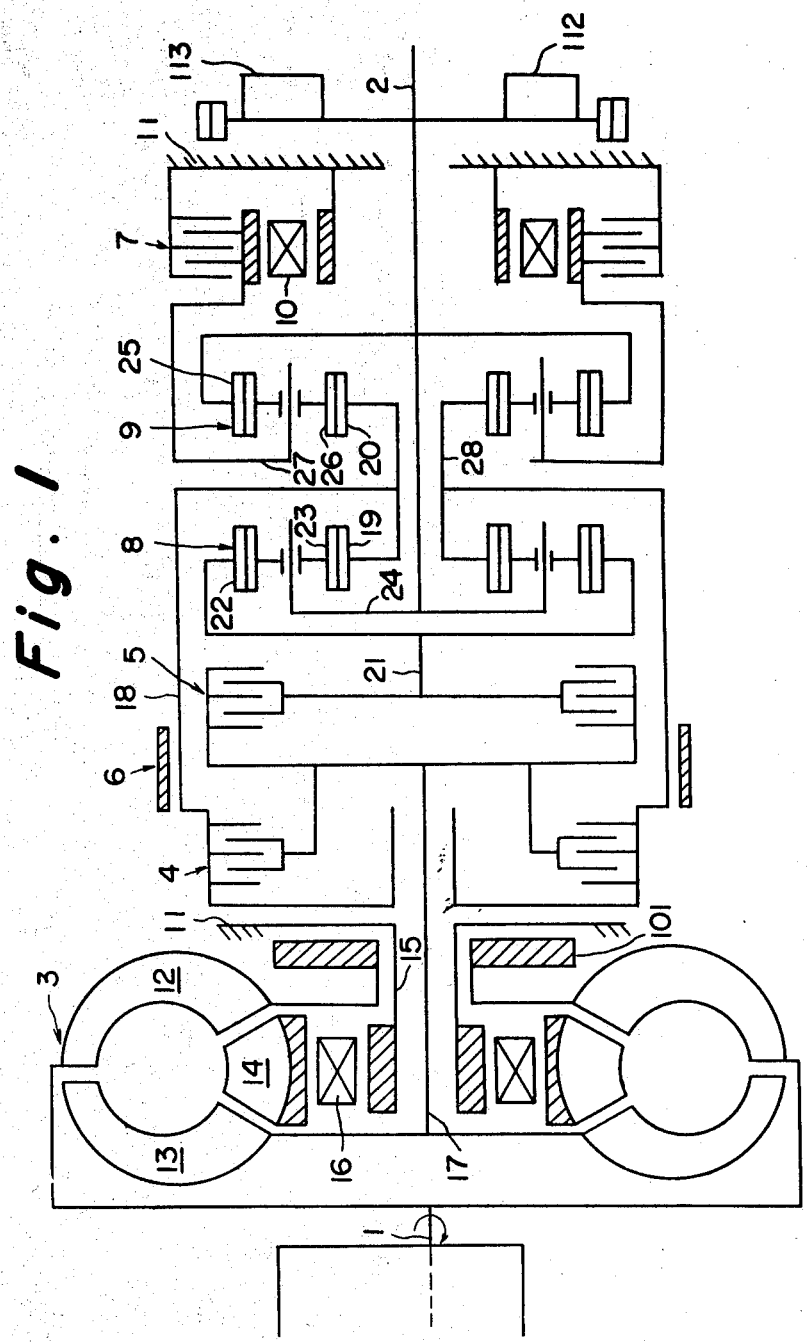
FIG. 1 shows a diagrammatic illustration of the gearing of an automatic transmission of a vehicle.

FIG. 1 shows in a schematic form a typical power transmission mechanism providing a three element torque converter unit and two planetary gear units. While this is used as an example to describe the invention, it will be understood that the present invention has application to any apparatus comprising a torque converter or a hydraulic coupling unit and a plurality of planetary gear units and providing a hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one-way brake 10 and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one-way clutch 16, and is filled with working fluid transmitting the driving torque. The power transmitted by the engine drive shaft 1 through the impeller 12 and the working fluid to the turbine 13 is transmitted through an intermediate shaft 17 which is connected from the turbine 13 to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A plurality of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only to the direction of the input shaft 1 indicated by an arrow. The friction brake 6 clamps the sun gears 19 and 20 through a hollow transmission shaft 28 by tightening to the drum 18.

The transmission mechanism shown in FIG. 1 provides three forward and one reverse speed ratios by suitable engagement of the friction elements as shown in Table 1.

TABLE 1

| Speeds | Gear ratio | Friction elements engaged | | | | |
|---|---|---|---|---|---|---|
| | | Clutch 4 | Clutch 5 | Brake 6 | Brake 7 | One-way Brake 10 |
| 1st | 2.45 | — | o | — | — | o |
| 2nd | 1.45 | — | o | o | — | — |
| 3rd | 1.00 | o | o | — | — | — |
| 1st (manual low) | 2.45 | — | o | — | o | o |
| Reverse | 2.18 | o | — | — | o | — |

NOTE.—"o" shows engagement of the friction element or locking of the one-way brake; and "—" shows disengagement or free relative rotations thereof.

In FIG. 1, no hydraulic control system for actuating the friction elements is shown, however, a few of the functional members are shown. These are engine driven fluid pump 101 and a governor valve assembly 112 and 113 which is connected to the output shaft 2.

Figure 2:
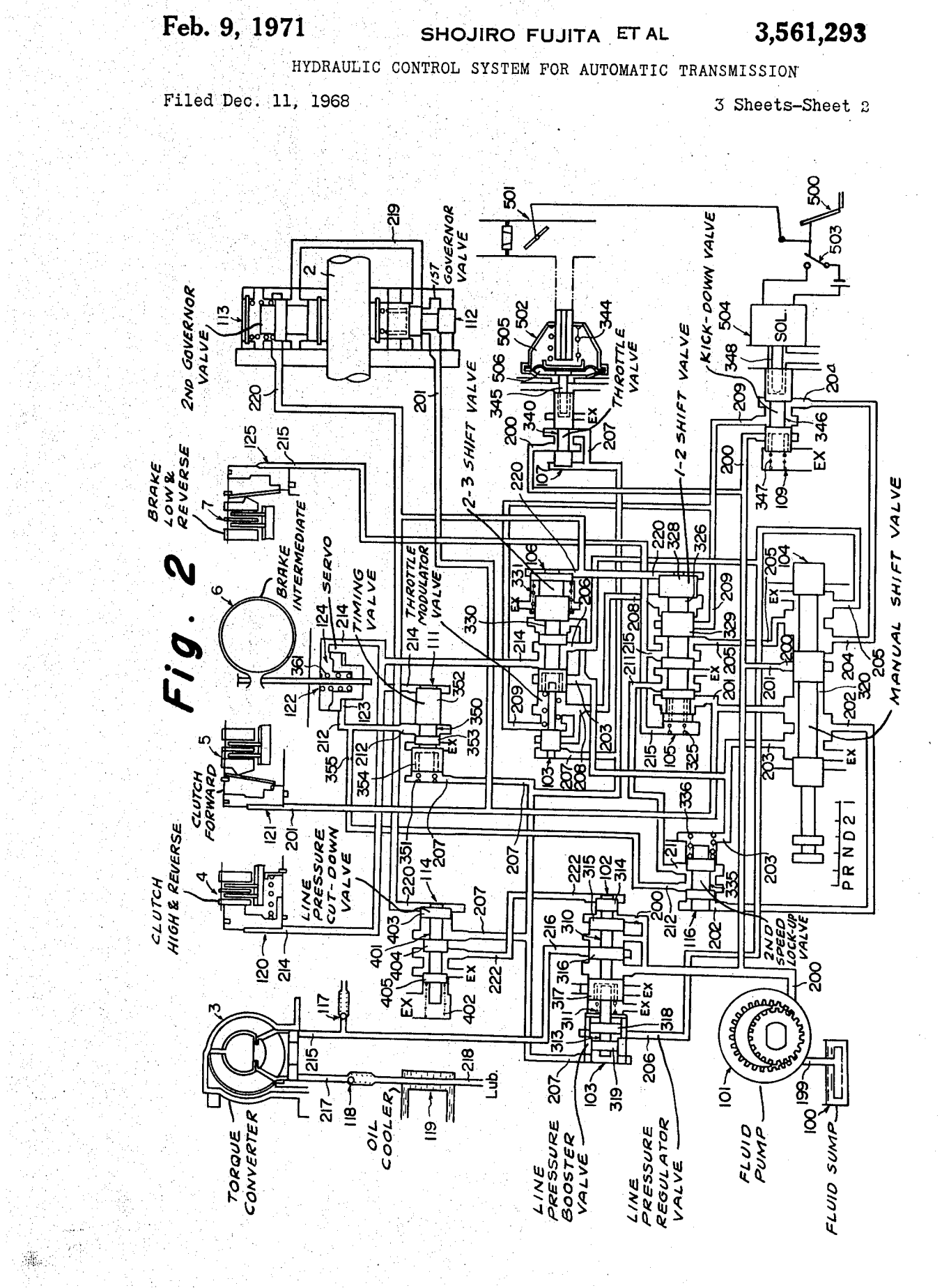

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, a fluid pump 101, a line pressure regulator valve 102, a line pressure booster valve 103, a manual shift valve 104, a 1–2 shift valve 105, a 2–3 shift valve 106, a throttle valve 107, a throttle modulator valve 108, a kick-down valve 109, a timing valve 111, a first governor valve 112, a second governor valve 113, a line pressure cut down valve 114, a 2nd speed lock up valve 116, a torque converter relief valve 117, and a torque converter check valve 118 to effect desired automatic shifting between the speed ratios by introducing predetermined line pressure to the friction elements. The control system further includes a torque converter oil cooler 119, a hydraulic servo 120 for engaging the friction clutch 4 by introducing hydraulic pressure to the servo 120, a hydraulic servo 121 for actuating the friction clutch 5, a hydraulic servo 122 for actuating the friction brake 6, an engage side brake chamber 123 and a release side brake chamber 124 of the hydraulic servo 122, a hydraulic servo 125 for actuating the friction brake 7, and also as control components, an acceleration pedal 500, a carburetor throttle valve 501, a vacuum diaphragm unit 502, a kick-down switch 503 to actuate the throttle valve 107 and a kick-down solenoid 504, and further, actuating and controlling conduits and passages properly connecting the valves and components to provide desired hydraulic control of automatic transmission.

The fluid for the hydraulic control system, working fluid of the torque converter 3 and lubricant fluid of the transmission mechanism are delivered by the hydraulic pressure source, which is the positive displacement fluid pump 101, driven by the engine as shown in FIG. 1 and adapted to draw fluid from the sump 100 through suction line 199 and to supply fluid under pressure to the above mentioned components through passage 200. The fluid pressure in the passage 200 is a main pressure source of the hydraulic circuit and is mentioned as a line pressure.

The line pressure through passage 200 is regulated by the line pressure regulator valve assembly 102 and 103 as will be described more fully hereinafter. The fluid under pressure which is supplied to the torque converter 3 from the passage 200 through the pressure regulator valve 102 and the passage 216 is regulated by the torque converter relief valve 117 which prevents the fluid pressure from increasing beyond a predetermined value. The fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operated by the vehicle operator to introduce the line pressure in the passage 200 to the passage 201 through the passage 206 as shown in Table 2, according to the selected positions of the shift lever not shown.

TABLE 2

| Passage | Selected position | | | | | |
|---|---|---|---|---|---|---|
| | P | R | N | D | 2 | 1 |
| 201 | — | — | — | o | o | o |
| 202 | — | — | — | o | o | — |
| 203 | — | — | — | o | — | — |
| 204 | o | o | — | — | o | o |
| 205 | o | o | — | — | — | o |
| 206 | — | o | — | — | — | — |

NOTE.—"o" shows the communication of the passage to the line pressure at the selected position; and "—" shows the communication of the passage to an exhaust port at the selected position. The operation of the power transmission mechanism shown in FIG. 1 according to the selected positions P, R, N, D, 2 and 1 will be as follows:
  P: The output shaft 2 is locked by a locking device not shown,
  R: reverse drive,
  N: neutral, the power is not transmitted to output shaft 2,
  D: forward drive, the transmission shown is shifted automatically between 1st, 2nd and 3rd speed ratios,
  2: lock in 2nd speed ratio,
  1: down shift from 2nd to 1st speed ratio and maintained in 1st speed ratio.

The manual shift valve spool 320 is shown in the neutral or position N in FIG. 2, thus relocking all operating passages from line pressure and communicating them to exhaust ports Ex which communicate to the sump 100 through passages not shown.

When the operator shifts the manual shift valve 104 to the automatic three speeds forward position D, passages 201, 202 and 203 communicate with the line pressure passage 200. The line pressure supplied through passage 201 actuates the hydraulic servo 121 to engage the friction clutch 5 all through the three speeds forward drive. Further, the passage 201 communicates to the 1–2 shift valve 105 and the first governor valve 112. The line pressure through the passage 203 is supplied to the 2–3 shift valve 106.

The 1–2 shift valve 105 comprises a valve spool 326 which is biased by a spring 327 to keep the valve spool 326 to the rightward position as shown in FIG. 2 at 1st speed ratio and blocks the passage 201 from communication any where. Since only the friction clutch 5 is engaged, the vehicle is driven forward in 1st speed ratio as shown in Table 1 due to the engagement of the one-way brake 10. In this case, as the one-way brake 10 is effective, the engine drives the wheels, but the wheels cannot drive the engine, so that an engine braking function is not effective due to free rotation of the one-way brake 10. As the vehicle speed increases the governor pressure produced by the governor valve assembly 112 and 113, as will be explained more in more detail hereinafter, through passage 220 urges the valve spool leftward, so that the passage 201 communicates to the passage 211 to apply hydraulic pressure to the engage side chamber 123 of the hydraulic servo 122 of the friction brake 6. Thus the friction brake 6 is engage to attain 2nd speed ratio of the power transmission mechanism as shown in Table 1.

The 2-3 shift valve 106 comprises a valve spool 330 which is biased the rightward position as shown in FIG. 2 by a spring 331 at 1st and 2nd speed ratios. As the vehicle speed further increases, governor pressure through passage 220 is increased sufficiently to urge the valve spool 330 leftward to communicate passage 203 to passage 214 through a groove of the valve spool 330. The line pressure through passage 214 is supplied to the hydraulic servo 120 to engage the friction clutch 4 and also to the release side chamber 124 of the hydraulic servo 122 to release the friction brake 6. By providing an area difference between the chambers 124 and 123, the friction brake is released when both chambers 124 and 123 are supplied by line pressure, so that a smooth shift process between the 2nd and 3rd speed ratios is attained. Thus as shown in Table 1 the power transmission mechanism shown in FIG. 1 is driven in 3rd speed ratio or direct coupling.

When the operator selects the position "2" by shifting the manual shift valve 104, the line pressure through passage 200 is supplied to passages 201, 202 and 204. The line pressure through passage 201, as in selected position D, engages the friction clutch 5.

The 2nd speed lock up valve 116 comprises a valve spool 335 which is biased to leftward position as shown in FIG. 2 by a spring 336 when passages 202 and 203 are both communicated to the line pressure or exhaust port, so that passages 211 and 212 are communicated. Thus when the passage 211 is communicated to the line pressure, the pressure is supplied to engage side chamber 123 of the hydraulic servo 122 to engage the friction brake 6. When the position "2" is selected, passage 202 communicates to line pressure and passage 203 communicates to an exhaust port, thus the valve spool 335 is urged rightward to communicate passage 202 to passage 212 so that the line pressure is supplied to the engage side chamber 123 of the hydraulic servo 122 to engage the fraction brake 6. Thus 2nd speed ratio is attained. The valve spool 335 is maintained in the rightward position throughout the selected position "2" and is not affected by vehicle operating conditions such as speed or throttle opening.

When the operator selects the position "1" by shifting the manual shift valve 104, the line pressure through passage 200 is communicated to passages 201, 204 and 205. As explained before, the line pressure through passage 201 acts to engage the friction clutch 5 all through the position "1." The line pressure through passage 205 communicates to passage 215 when the 1-2 shift valve 105 is rightward position as shown in FIG. 2, so that the line pressure actuates the hydraulic servo 125 to engage the friction brake 7, thus 1st speed ratio is obtained. If the 1-2 shaft valve 105 is kept leftward by governor pressure through passage 220, when the position "1" is selected by the manual shift lever from other positions, the passage 201 communicates through passages 211 the 2nd speed lockup valve 116 and passage 212 to the engage side chamber 123 of the hydraulic servo 122 to engage the friction brake 6. Thus the 2nd speed ratio is attained. In the position "1," passages 203 and 206 communicate with exhaust port so that the 3rd speed ratio cannot be attained because the friction clutch 4 is not engaged. When the 1-2 shift valve 105 is urged to rightward, the 1st speed ratio is attained as before, and the line pressure through passages 215 urges the valve spool 326 from the first end surface of the spool 326, so that the 1st speed ratio is maintained. In this case, as the friction brake 7 is engaged, the planet carrier 27 of the rear planetary gear unit 9 is clamped in both directions so that an engine braking function can be obtained as compared to1st speed ratio of the position D.

When the manual shift valve 104 is shifted to reverse drive position R, the line pressure through passage 200 is supplied to passages 204, 205 and 206. The line pressure through passage 205 is applied to engage the friction brake 7 as aforesaid, and the line pressure through passage 206 is communicated through the 2-3 shift valve 106 and the passage 214 to the hydraulic servo 120 to engage the friction clutch 4. Thus, as shown in Table 1, the output shaft 2 of the power transmission mechanism rotates in the reverse direction.

The governor valve assembly 112 and 113 is mounted to the output shaft 2 of the power transmission as shown in FIG. 2 and is adapted to supply hydraulic pressure representing the vehicle speed to passage 220. The governor valve may be of any construction representing the vehicle speed. In the illustrated embodiment, the line pressure through passage 201 is introduced in the first governor valve 112 which is constructed as pressure regulator valve to produce increasing hydraulic pressure as a function of increasing rotational speed of the output shaft 2. The pressure, which is determined by equilibrium between the centrifugal force, the spring bias pressure, and the hydraulic pressure is supplied through the passage 219 to the second governor valve 113 constructed as a change-over valve and adapted to supply fluid pressure beyond a predetermined speed of the output shaft 2 of the vehicle to the passage 220. The governor pressure through passage 220 is supplied to the 1-2 shaft valve 105 and the 2-3 shift valve 106 to urge the valve spools 326 and 330 respectively, as described before, when the vehicle speed exceeds respective predetermined values, so that the communication passages of the line pressure are changed to effect automatic shifting between 1st and 3rd speed ratios. Also, the passage 220 is communicated to the right end surface of spool 401 of the line pressure cut-down valve 114 to regulate hydraulic presure actuating the friction elements as will be explained in more detail hereinafter.

The kick down valve 109 comprises a valve spool 346 which is biased the rightward position by a spring 347 to block the communication between passages 200 and 209. Engaging the right end surface of the spool 346, the kick down solenoid 504 is provided. As the acceleration pedal 500 is depressed, the kick down switch 503 is closed to energize the solenoid 504 and thus actuate rod 348 to urge the valve spool 346 leftward, so that the line pressure through passage 200 communicates to passage 209. The fluid pressure through passage 209 communicates to a groove between area difference lands 328 and 329 to urge the spool 326 rightward when the spool 326 is shifted leftward. Also, the passage 209 communicates to the left end surface of the spool 330 of the 2-3 shift valve 106 to urge the spool 330 rightward. Consequently, the valve spool 330 or 326 will move rightward when the urging force overcomes the biasing force of the governor pressure through passage 220, so that the down-shift from 3rd to 2nd or from the 2nd to the 1st speed ratio will be obtained.

To detect the engine torque, the throttle opening or the negative pressure in the intake manifold of the engine may be available. In the illustrated embodiment, the engine torque is detected by negative pressure in the engine intake manifold. In the general gasoline engine, the engine torque is higher as negative pressure in the intake manifold is smaller. To detect the engine torque the vacuum pressure diaphragm unit 502 is provided to engage the right end surface of the throttle valve 107 by a rod 345, and when pressure in vacuum chamber 505 of the vacuum diaphragm unit 502 is equal to atmospheric pressure in chamber 506, throttle valve spool 340 is urged leftward, and also, as the vacuum is increased in the chamber 505 the biasing pressure to the spool 340 is decreased. The throttle valve 107 regulates the line pressure through passage 200 by leaking a portion thereof to an exhaust port to produce a hydraulic pressure representing the urging force of the vacuum diaphragm unit 502 and also representing the engine torque to passage 207. The throttle pressure through passage 207 is supplied to the left end surfaces of the line pressure booster valve 103 and the throttle modulator valve 108 which is combined to the 2–3 shift valve 106 so that the valve spools are biased to regulate shift points or to regulate line pressure through passage 200.

The line pressure regulator valve assembly 102 and 103 consists of the line pressure regulator valve 102 comprising a spool 310 and a biasing spring 311 and the pressure booster valve 103 comprising a spool 313 which is assembled in line to the spool 310. Fluid pressure produced by the oil pump 101 is introduced through passage 200 between lands 314 and 315 of the spool 310 and urges the spool 310 leftward due to the area difference between the lands 314 and 315 against the biasing spring 311. When the fluid pressure through passage 200 is higher than a predetermined value, the spool 310 is urged leftward to open communication between passages 200 and 216 and supply torque converter working fluid as previously mentioned. When the fluid pressure is further increased, the spool 310 moves leftward and land 317 thereof opens to an exhaust port to leak a portion of fluid and to reduce the hydraulic pressure in the passage 200. Thus, an equilibrium is produced between the urging hydraulic force and the biasing spring force, consequently, the fluid pressure in passage 200 is regulated to the desired line pressure.

The line pressure booster valve biases the spool 310 of the regulator valve 102 by the spool 313 when fluid pressure is applied to the left end surface of land 319 through passage 206, or between area difference lands 318 and 319 through passage 206, so that line pressure increases to attain equilibrium between the forces. On the contrary, when fluid pressure is applied to the right end surface of the spool 310 of the regulator valve 102 through passage 222 to urge the spool 310 leftward, the regulated line pressure through passage 200 is decreased correspondingly to attain equilibrium again.

The line pressure cut-down valve 114 comprises a valve spool 401 and a biasing spring 402. Governor pressure through passage 220 is applied to the right end surface of land 403 of the spool 401 to urge the spool 401 leftward against the spring force, and throttle pressure through passage 207 is applied between area difference lands 403 and 404 to urge the spool 401 rightward. Thus, when the force produced by governor pressure is larger than the force produced by the spring 402 and throttle pressure, spool 401 is urged leftward to communicate passages 207 and 222, and when governor pressure is lower, the passage 222 is exhausted. Consequently, when the governor pressure is sufficiently high, throttle pressure through passage 207 is applied to both end surfaces of the line pressure regulator valve assembly 102 and 103 and as the land 314 is smaller than the land 319, line pressure increases as throttle pressure or engine torque increases.

The timing valve 111, according to the present invention comprises a valve spool 350 and a biasing spring 351 to keep the spool 350 to the right end position as shown in FIG. 2. Further to the left end surface of the spool 350, throttle pressure through passage 207 is applied so that the spool 350 is maintained in the right end position unless a high fluid pressure, i.e. a pressure beyond the combined spring force and multiplication of the throttle pressure by the area difference of the lands 352 and 354 of both ends of the spool 350, is applied to right end of the spool 350.

As to upshifts from 2nd to 3rd speed ratio, as previously described, governor pressure through passage 220 increases to urge valve spool 330 of the 2–3 shift valve 106 leftward to communicate passages 203 and 214, so that fluid pressure through passage 214 is applied to the release side chamber 124 of the hydraulic servo 122 of the friction brake 6 to release or disengage the brake 6, and also to the hydraulic servo 120 of the friction clutch 4 to engage the clutch 4. Thus 3rd speed ratio or direct coupling is attained.

Figure 3A:
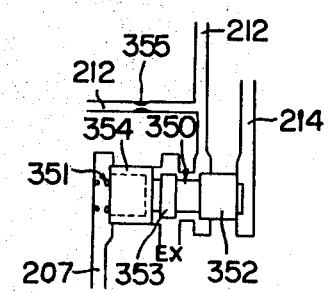
FIGS. 3a and 3b show operations of the timing valve shown in FIG. 2.

Line pressure through passage 214 is also applied the right end surface of spool 352 of the timing valve 111, so that, at a point of increasing fluid pressure as a function of time through passage 224, the fluid pressure applied to the right end of spool 350 overcomes the combined spring force and throttle pressure in passage 207 to urge the spool 350 leftward as shown in FIG. 3a. Consequently, passage 212 is communicated to an exhaust port to decrease fluid pressure in the engage side chamber 123 of the hydraulic servo 122, so that the friction brake 6 is released quickly. The passage 212 is communicated to line pressure through the 2nd speed lock-up valve 116, passage 211, to the 1–2 shift valve 105 and passage 201. However, due to restriction 355 provided in the passage 212, the line pressure itself is not decreased by the exhaust of pressure from the engage side chamber 123.

Figure 3B:
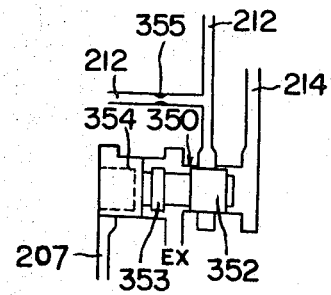

As the line pressure through passage 214 increases, the valve spool 350 is urged to the left end position as shown in FIG. 3b, so that passage 212 is blocked from the exhaust port, and remaining fluid in the engage side chamber 123 is forced through the restriction 355 in passage 212 owing to the area difference between the engage side 123 and release side 124 of the hydraulic servo 122 as an ordinary release process of the brake 6.

Thus, by properly selecting the spring 351 and areas of lands 352 and 354, the spool 350 is urged leftward below a predetermined throttle pressure.

By providing the above described timing valve 11, at 2–3 upshifting under high engine torque conditions, the valve spool 350 of the timing valve 111 is not urged leftward due to high throttle pressure, so that the disengage timing of the intermediate speed ratio brake 6 is delayed. Thus overlap of engagement of both clutch 4 and brake 6 is caused so that smooth upshifting is obtained by forcibly slipping the friction elements.

At 2–3 upshifting under low engine torque conditions, the valve spool 350 of the timing valve 111 is urged leftward by an increase of fluid pressure through passage 214 and low throttle pressure, and passage 212 is communicated to an exhaust port between the displacement process of the spool 350 as shown in FIGS. 3a and 3b, so that fluid pressure the engage side chamber 123 is decreased to effect quickly release of the friction brake 6. Thus the above mentioned overlap period is greatly decreased, and a neutral condition is obtained by disengagement of both friction elements. As the spool 350 is urged to the left end position as shown in FIG. 3b, engage side chamber 123 is applied by line pressure, so that after the position of the spool 350 shown in FIG. 3b is reached the release process is completed by ordinary process. Thus, by decreasing the overlap period or by causing a neutral period, the output shaft is not clamped at the low torque operating condition, and smooth upshifting is attained.

It will be appreciated that, by providing the timing valve 111 according to the invention, which is only effective at 2–3 upshifting and only at low engine torque operating conditions, the displacement of the value spool 350 thereof so as to communicate the engage side chamber 123 to exhaust port occurs only between the displacement process of the spool 350 from the extreme rightward position to the extreme leftward position. The disengagement timing of the friction brake 6 is thereby decreased so that overlap timing of both engagements is greatly decreased or neutral timing of both disengagements is produced. Thus, smooth upshifting through different operating conditions is performed by properly regulating the release timing of the brake 6 at low torque conditions by the timing valve 111.

What is claimed is:

1. A hydraulic control system for an automatic transmission mechanism for vehicles, said automatic transmission having an input and an output shaft, at least one planetary gear unit disposed between said shafts, and a plurality of friction elements including at least a first and a second friction element connected to said planetary gear unit for obtaining a plurality of gear ratios by selectively engaging said friction elements by hydraulic pressure produced in said hydraulic control system, said gear ratios including at least a higher and a lower forward drive gear ratio, said hydraulic control system comprising, a fluid pump for producing line pressure, line pressure passage means connected to the output of said fluid pump for distributing said line pressure, a line pressure regulator valve connected to said line pressure passage means for regulating said line pressure, a manual shift valve connected to said line pressure passage means for manually controlling distribution of said line pressure, a plurality of hydraulic servo means for actuating said friction elements upon the introduction of said line pressure to said servo means, said hydraulic servo means including a first hydraulic servo for actuating said first friction element to attain said higher gear ratio and a second hydraulic servo for actuating said second friction elements to attain said lower gear ratio, said second hydraulic servo having an engage side fluid chamber for applying said second friction element and a release side fluid chamber to release said second friction element when line pressure is applied to both chambers, shift valve means connected between said manual shift valve and said servo means for controlling distribution of line pressure to said servo means, throttle valve means connected to said line presure passage means for producing throttle pressure representing engine torque, a first fluid passage means communicating said first hydraulic servo and said release side fluid chamber of said second hydraulic servo with said shift valve means, a second fluid passage means communicating said engage side fluid chamber of said second hydraulic servo with said shift valve means, a third fluid passage means communicating said second passage means to an exhaust port, timing valve means positioned in said third passage means, throttle pressure passage means communicating said throttle valve means with said timing valve means to bias said timing valve to block said third passage means, said first passage means further communicating with said timing valve means, whereby, when said throttle pressure in said throttle pressure passage is below a predetermined valve, hydraulic pressure in said first fluid passage to engage said first friction element acts to open said timing valve means and allow said engage side fluids chamber of said second hydraulic servo to be communicated to said exhaust port to obtain rapid disengagement of said second friction element during an upshift from said lower to said higher gear ratio.

2. A hydraulic control system as claimed in claim 1, wherein said timing valve means further comprises a valve spool having a first position for blocking communication of said third passage from said exhaust port and a second position for communication of said third passage to said exhaust port, a biasing means for biasing said valve spool to said first position, said throttle pressure in said throttle pressure passage means communicating with said valve spool to bias said valve spool to said first position, said first passage communicating with said timing valve means to bias said valve spool to said second position upon the application of hydraulic fluid pressure to said first passage, whereby said valve spool acts to communicate said third passage to said exhaust port when the pressure in said first passage in conjunction with the opposing forces of said biasing means and said throttle pressure act to position said valve spool between said first and second positions to control the timing of the disengagement of said second friction element.

References Cited

UNITED STATES PATENTS

| | | | |
|---|---|---|---|
| 3,310,991 | 3/1967 | Leonard | 74—869X |
| 3,362,261 | 1/1968 | Synder et al. | 74—869X |
| 3,393,585 | 7/1968 | Pierce, Jr. | 74—869X |
| 3,394,622 | 7/1968 | Chana | 74—867 |
| 3,446,098 | 5/1969 | Searles | 74—869 |

ARTHUR T. McKEON, Primary Examiner